United States Patent
Rivera et al.

(10) Patent No.: US 7,444,141 B2
(45) Date of Patent: Oct. 28, 2008

(54) METHOD AND SYSTEM FOR PROGRAMMABLE CONTROL OF MOBILE COMMUNICATIONS UNITS

(76) Inventors: Sergio Rivera, 11350 NW. 50th Ter., Miami, FL (US) 33178; Victor Maldonado, 3200 SW. 194th Ter., Miramar, FL (US) 33029

( * ) Notice: Subject to any disclaimer, the term of this patent is extended or adjusted under 35 U.S.C. 154(b) by 654 days.

(21) Appl. No.: 10/460,098

(22) Filed: Jun. 12, 2003

(65) Prior Publication Data

US 2004/0253941 A1    Dec. 16, 2004

(51) Int. Cl.
*H04M 3/00*    (2006.01)

(52) U.S. Cl. .................... 455/418; 455/432.2; 455/514; 709/247

(58) Field of Classification Search .................. 455/418, 455/432.2, 514, 408; 709/247; 717/140, 717/145, 146, 171, 176
See application file for complete search history.

(56) References Cited

U.S. PATENT DOCUMENTS

| | | | | |
|---|---|---|---|---|
| 5,153,591 | A * | 10/1992 | Clark | 341/51 |
| 5,325,418 | A | 6/1994 | McGregor et al. | |
| 5,577,100 | A | 11/1996 | McGregor et al. | |
| 5,625,669 | A | 4/1997 | McGregor et al. | |
| 5,878,339 | A | 3/1999 | Zicker et al. | |
| 6,052,450 | A * | 4/2000 | Allison et al. | 379/127.06 |
| 6,198,915 | B1 * | 3/2001 | McGregor et al. | 455/406 |
| 6,907,516 | B2 * | 6/2005 | Kirovski et al. | 712/210 |
| 2002/0065691 | A1 * | 5/2002 | Twig et al. | 705/7 |
| 2003/0023698 | A1 * | 1/2003 | Dieberger et al. | 709/207 |

FOREIGN PATENT DOCUMENTS

JP    HEI 1-181279    7/1989

* cited by examiner

*Primary Examiner*—Nay Maung
*Assistant Examiner*—Tuan H. Nguyen
(74) *Attorney, Agent, or Firm*—James S. Finn, Esq.

(57) ABSTRACT

Accordingly, the present invention provides a toolkit for building programmable rules of operation for a prepaid mobile communications unit and for loading the rules into the prepaid mobile unit's internal memory. A rules development language is provided with a predetermined syntax. A rule set is composed of sentences comprising strings of sequential operands terminated by a delimiter operand. Each operand comprises a low-level operator and its corresponding argument. The function of each low-level operator is predefined, with the number of corresponding arguments varying according to the operator type. Once constructed, the rules are compressed and loaded into the internal memory of a prepaid mobile unit and used to determine call restrictions, click rates, surcharges, or otherwise process calls. The compressed rules are encoded into number segments which are delivered to the internal memory of the prepaid mobile unit using a transport mechanism such as, for example, the mobile unit's keypad, or using an over-the-air transport protocol. Inside the communication device mobile communications unit, the compressed rules are then reassembled from the received number segments and stored in the internal memory of the communication device mobile communications device.

6 Claims, 13 Drawing Sheets

METHOD AND SYSTEM FOR PROGRAMMABLE CONTROL OF MOBILE COMMUNICATIONS UNITS

BACKGROUND OF THE INVENTION

The present invention relates to a programmable control mechanism for defining the rules of operation of a mobile communications unit.

Prepaid cellular service is a form of cellular service in which a user must pay in advance for use of the service. Typically, a user purchases a definite amount of air time wireless network access (airtime) at an initially pre-defined exchange of monetary value versus units of airtime credit from a prepaid cellular service provider. These measures of units of airtimes are commonly valued at units of minutes. When the user places or receives a call or otherwise uses the service, the service provider decrements the user's pre-purchased air time units. The rate at which pre-purchased air time unit is deducted per unit of time is known as the deduct rate. Once the pre-purchased air time unit has been exhausted, the user is denied service until the user purchases additional units.

The deduct rate applied against a user's pre-purchased air time unit varies according to call type. Examples of different call types include local calls, local long distance calls, international long distance calls, free calls, and roaming and data calls; all of which may be inbound or outbound. The call type can be determined by referencing a set of rules, such as the telephone numbering plan, which define the length and format of telephone numbers within a telephone system.

However, telephone numbering plans vary significantly from country to country and in many cases differ from region to region within the same country. For example, in the United States, a seven to ten digit telephone number may correspond to a local call. An eleven digit telephone number (one+area code+seven digits) may be long distance, local or free call, depending on the area code. In Peru, however, a local number is defined as a sequence of six digits, except in the city of Lima where a local number is seven digits long. In Mexico, a local telephone number is eight digits long in some areas, and seven digits long in others. In Brazil, by contrast, all local numbers are always eight digits long.

Additionally, rules for determining toll free and emergency calls vary significantly from country to country. In the United States, "911", "*911" and "#911" are an emergency number and are toll free. Similarly, calls placed to "800" exchanges are generally toll free. However, this is not the case in Mexico or Costa Rica. Every country has reserved a different set of emergency and toll free numbers.

To program prepaid cellular telephones with software capable of resolving every conceivable international variation in telephone numbering and tariff rules would consume an unacceptable level of a telephone's limited memory and processing power. To avoid this problem, prepaid cellular telephones employ customized algorithms loaded into the firmware to compute deduct rates. The customized software is limited to processing rules from one country or one specific region. To be able to use the prepaid telephone in a different region, the user must either buy a telephone customized to operate in that region, or must have the telephone reprogrammed with the appropriate customized software.

However, employing customized region-specific algorithms in prepaid cellular telephones is undesirable for the frequent traveler. Moreover, the process of "re-flashing" the firmware of a prepaid telephone with customized software to process the rule set of a different country or region generally requires transporting the telephone to a service location for reprogramming. This results in added cost and inconvenience to both users and prepaid cellular providers.

Thus, there exists a need in the art for a method and system of flexibly and conveniently enabling prepaid cellular telephones to compute appropriate unit deduction rates in the broadest possible variety of international or rate changing national environments.

SUMMARY OF THE INVENTION

Accordingly, the present invention provides a software toolkit for building programmable rules of operation for a prepaid mobile communications unit and for loading the rules into the prepaid mobile unit's internal memory. In accordance with an exemplary embodiment of the present invention, a rules development language is provided with a predetermined syntax. A rule set is composed of sentences comprising strings of sequential operands terminated by a delimiter operand. Each operand comprises a low-level operator and its corresponding argument. The function of each low-level operator is predefined, with the number of corresponding arguments varying according to the operator type.

Once constructed, the rules are compressed and loaded into the internal memory of a prepaid mobile unit and used to determine call restrictions, click rates, surcharges, or otherwise process calls. The compressed rules are encoded into number segments which are delivered to the internal memory of the prepaid mobile unit using a transport mechanism such as, for example, the mobile unit's keypad, or using an over-the-air transport protocol. Inside the mobile communications device, the compressed rules are then reassembled from the received number segments and stored in the internal memory of the mobile communications device.

DETAILED DESCRIPTION OF THE INVENTION

Figure 1:
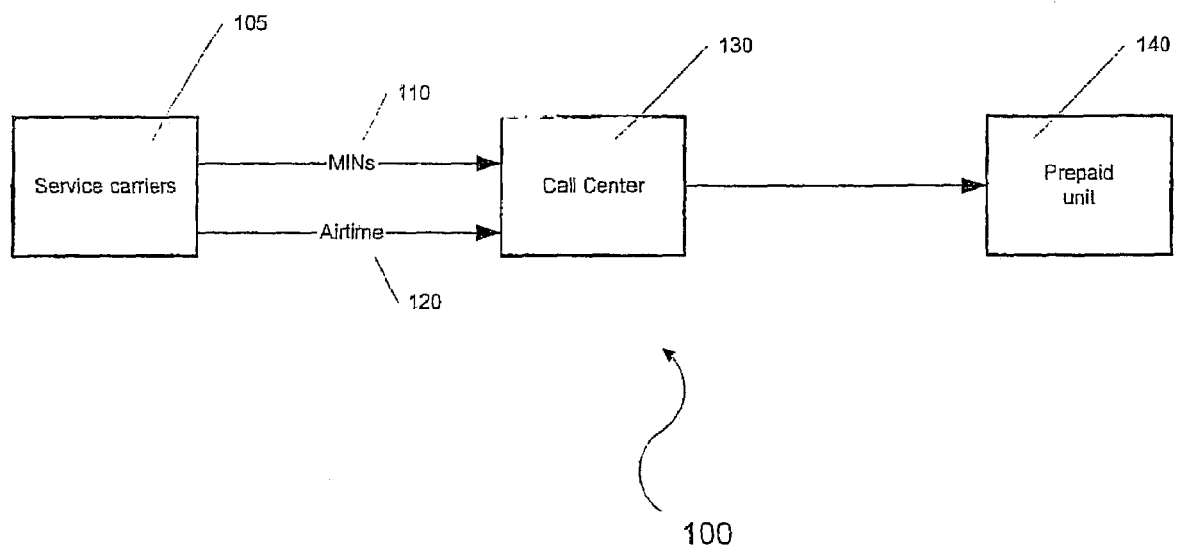
FIG. 1 is a block diagram of a prepaid mobile communications system.

FIG. 1 is a block diagram depicting a prepaid mobile communications system. A prepaid mobile communications system 100 includes a call center 130 and one or more prepaid communication devices 140. Prepaid communication device 140 may be, for example, a mobile telephone, a cellular telephone, or a satellite telephone, or any other wireless, portable or non-portable, means of information, including voice or data transfer.

Although for the sake of clarity and simplicity, an exemplary embodiment of the present invention is described in terms of a prepaid communication device in a prepaid mobile communications system, it should be understood that the present invention is not limited to this exemplary embodiment. Alternative embodiments of the present invention may include any mobile communications device with internally stored rules of operation that change depending on the geographic area in which the device operates.

Moreover, for the sake of clarity, software architectures may be described in terms of certain modules. It should be understood that where a plurality of software modules are described, the functions performed by the plurality of modules may alternatively be performed by a single module. Similarly, where a single module is described, the functions performed by the single module may alternatively be performed by a plurality of modules.

A call center 130 is an administrative entity which contracts with, for example, service carriers 105 to purchase air time 120. A mobile service carrier 105 may be, for example, a cellular service carrier such as AT&T® Wireless Services, Verizon Wireless®, Cingular®, T-Mobile®, etc. Service carriers 105 allocate blocks of mobile identification numbers ("MINs") 110 to the call center. Call center 130 is responsible for properly assigning Mobile Identification Numbers or MINs to prepaid communication devices 140 and for managing the air time 120 assigned to each prepaid communication device 140.

Figure 2:
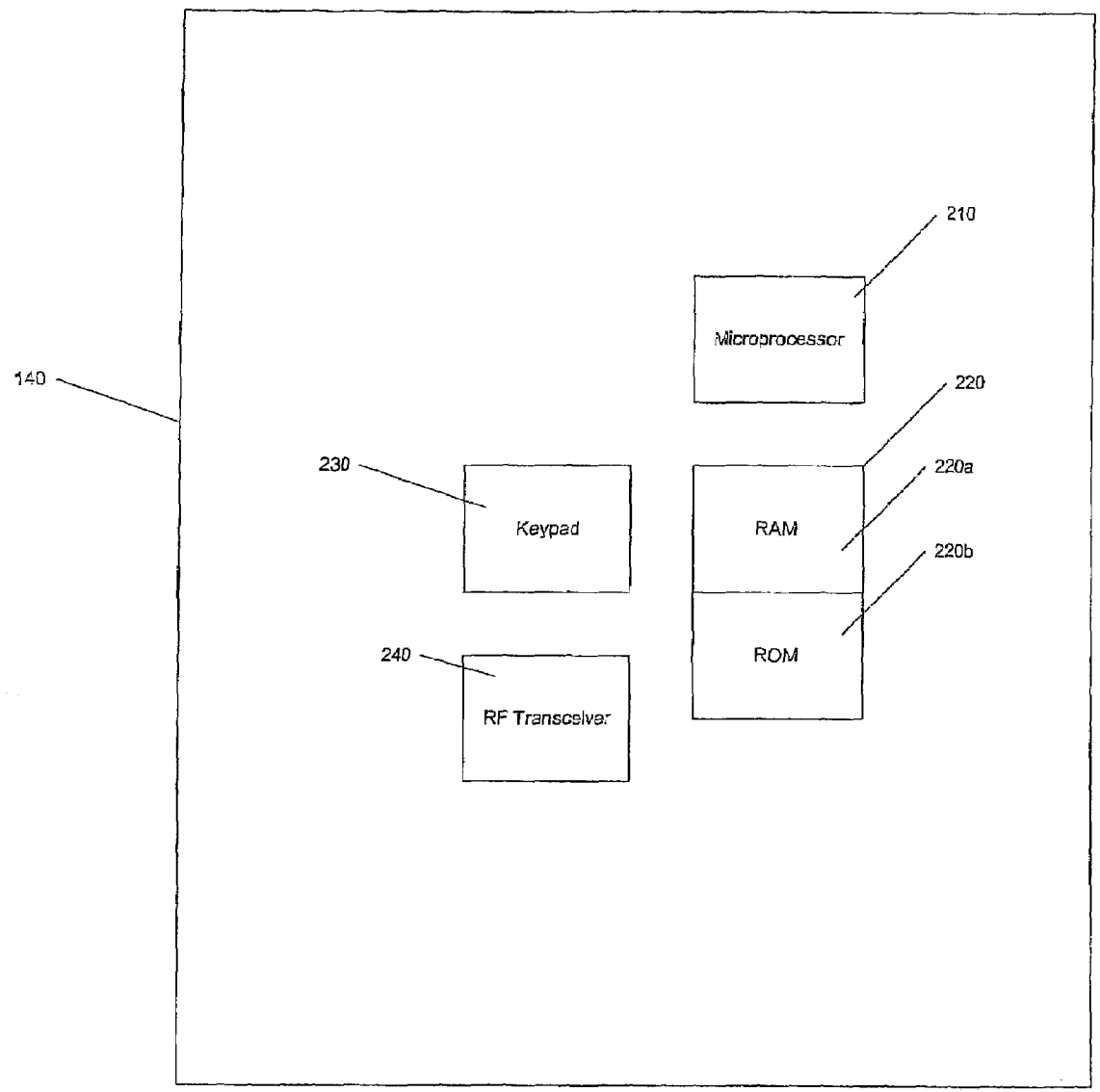
FIG. 2 is a block diagram of a prepaid mobile device in accordance with an exemplary embodiment of the present invention.

FIG. 2 is a block diagram of a prepaid communication device in accordance with an exemplary embodiment of the present invention. A prepaid communication device 140 provides mobile communications for a user by allowing the user remote access to the prepaid mobile communications system. Prepaid communication device 140 includes, for example, a microprocessor 210, memory 220, a user interface such as a keypad 230, and transceiver 240. Memory 220 may include, for example, random access memory ("RAM") 220a, or read only memory ("ROM") 220b. RAM may be volatile or non-volatile RAM ("NVRAM").

Prepaid communication device 140 contains embedded software including programs and data stored internally in memory 220. The embedded software instructs the prepaid communication device 140 how to handle inbound and outbound calls, what deduct rate to apply against the call, and how many air time units are available to the user. A call includes an analog or digital voice transmission, or a circuit switched or packet switched data transmission or SMS or the like.

Figure 3:
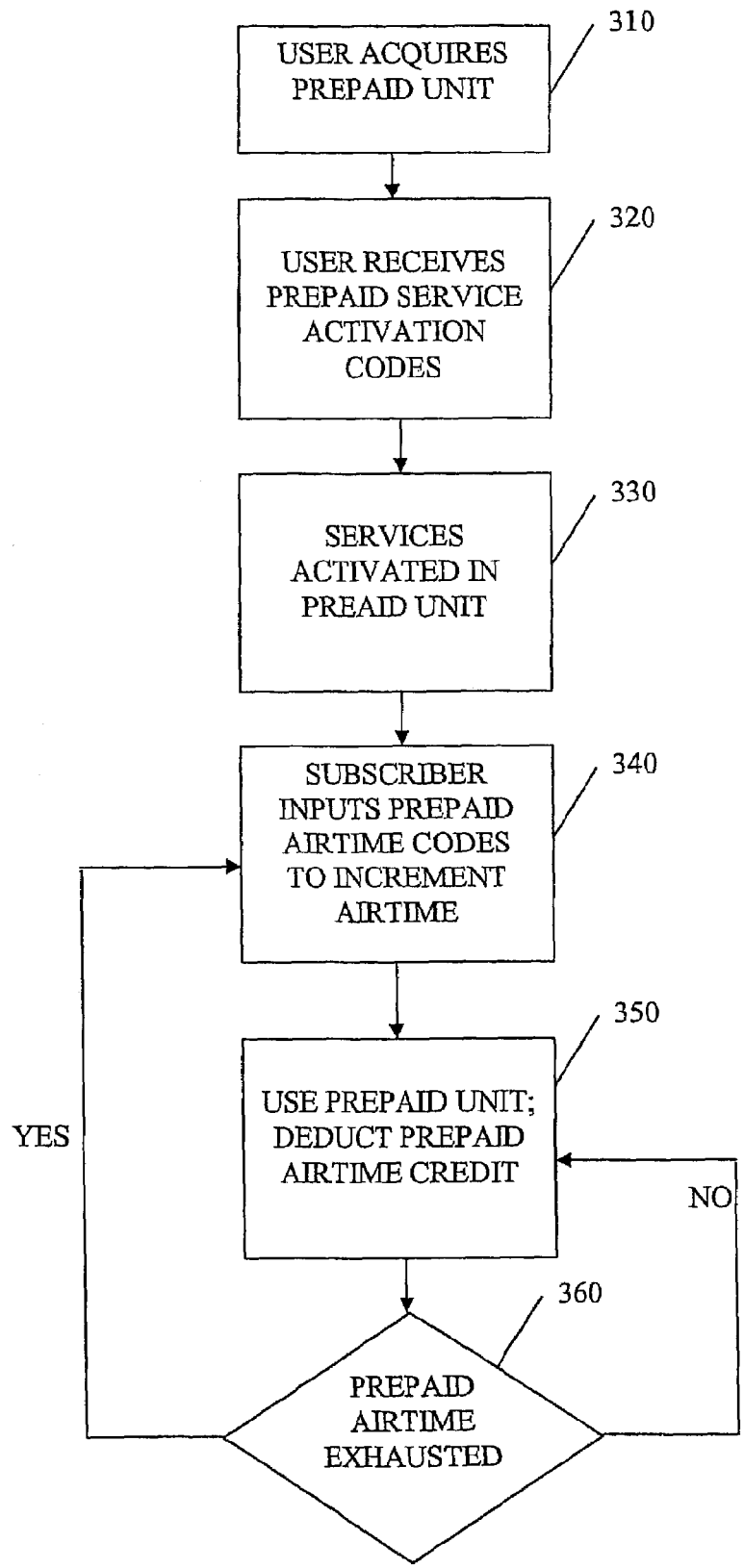
FIG. 3 is a flow chart depicting a method for prepaid mobile communications in accordance with an exemplary embodiment of the present invention.

FIG. 3 is a flow chart depicting a method for prepaid mobile communications in accordance with an exemplary embodiment of the present invention. At step 310, a user acquires a prepaid unit 140 through, for example, a retail purchase. Prepaid communication device 140 is preprogrammed with active prepaid software. At step 320, the user contacts the call center 130 to request activation of service and programming of the prepaid software in the prepaid communication device 140 and receives a unique encrypted activation code from the call center 130.

At step 330 the user, via the keypad, inputs the encrypted activation code into the prepaid unit 140. This activates the service. At step 340, the subscriber loads pre-purchased air time into memory 220 of prepaid communication device 140 by redeeming, for example, a previously purchased air time coupon. The subscriber may redeem an air-time coupon by receiving an encrypted air time code from the call center 130. At step 340, the subscriber enters the prepaid air time code into prepaid communication device 140 using keypad 230.

Alternatively, the call center 130 may deliver the prepaid air time code to the prepaid communication device 140 using an over-the-air transport mechanism. Over-the-air air transport mechanisms may include use of DTMF tones, SMS or cellular control channel protocols, such as those described in the ELA/TIA's/ETSI published standards for Over-the-Air Service Provisioning ("OTASP") and Over-the-Air Parameter Administration ("OTAPA").

At step 350 the user may place or receive calls on the prepaid communication device 140. As the user makes use of the prepaid communication device 140, software inside the prepaid communication device 140 deducts pre-purchased air time units credit accordingly. At step 360, if the user's pre-purchased air time units credit is exhausted, the prepaid communication device 140 locks itself, denying further use of the unit 220 until the user purchases and loads additional pre-purchased air time credits, step 340.

Figure 4:
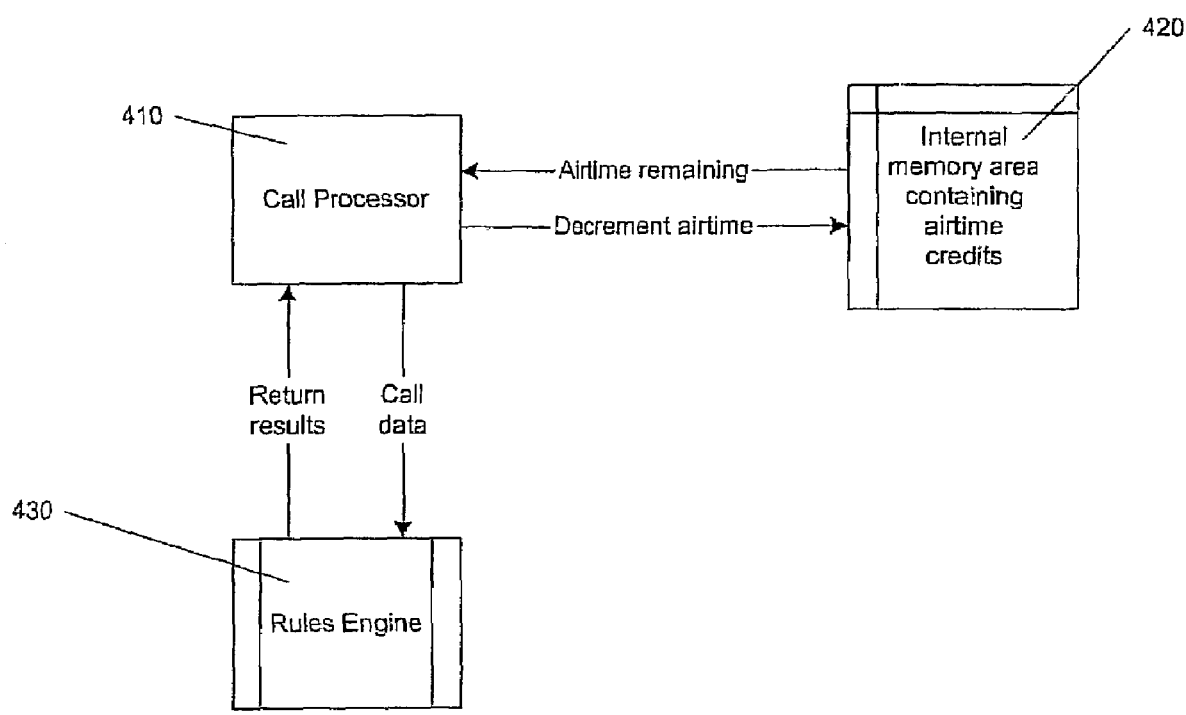
FIG. 4 is a block diagram depicting prepaid call processing modules in accordance with an exemplary embodiment of the present invention.

FIG. 4 is a block diagram depicting a software architecture in accordance with an exemplary embodiment of the present invention. A call processor module 410 detects a triggering event such as, for example, an inbound or outbound call. The call processor module 410 obtains certain data about the call such as, for example, the telephone number associated with the call. The call processor module 410 then calls a rules engine 430 to determine the appropriate deduct rate to apply against available air time units credit 420. The deduct rate is the time rate at which air time units credit is deducted during the call.

Rules engine 430 applies rules stored in internal memory 220 to the call data received by the call processor module 410. Based on the call data, the rules engine determines whether the call is restricted, and what deduct rate to apply against the call. Rules engine 430 returns the resulting information to the call processor module 410. Based on these results, the call processor module 410 either allows or prohibits the call, and if the call is allowed, applies the correct deduct rate and deducts air time credit 420 until the call is ended or air time credit 420 is exhausted.

Figure 5:
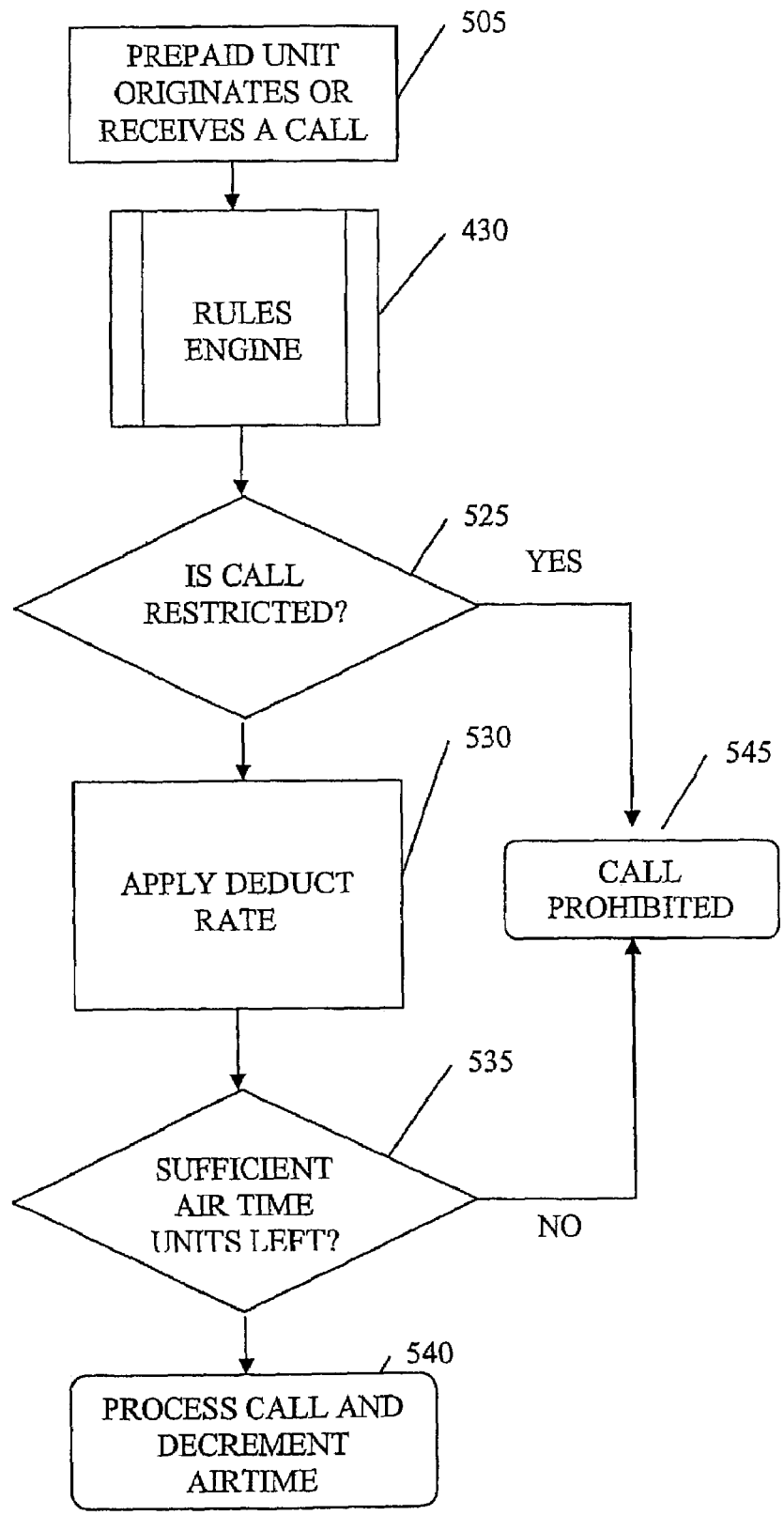
FIG. 5 is a flow chart depicting the flow of call processing in a prepaid mobile communications system in accordance with an exemplary embodiment of the present invention.

FIG. 5 is a flow chart depicting the flow of call processing in a prepaid mobile communications system in accordance with an exemplary embodiment of the present invention. A prepaid unit 140 either originates or receives a call at step 505. Call data, which may include, for example, the telephone number associated with the inbound or outbound call, is sent to the rules engine 430 at step 510. The rules engine 430 evaluates a set of rules, stored in memory 220, against the call data. These rules determine, for example: the call type (e.g., local, local long distance, international long distance, roaming, free, packet data, etc.); what call restrictions are in place; and what deduct rate will be applied against the call. For example, the rules may define the deduct rate for a local call as one (1) air time unit per minute, whereas the deduct rate for a long distance call may be one and one-half (1.5) air time units per minute.

If the rules engine 430 determines that the call is subject to a rules-based restriction, step 525, the call is blocked at step 545; otherwise the call is allowed. The deduct rate returned by the rules engine at step 530 is compared to the stored air time units credit at step 535. If the prepaid unit 140 has sufficient air time units credit stored, the call processor allows the call and decrements the air-time units credits at step 540. If all air time units credits have been exhausted, the call is prohibited, step 545, until the user purchases and loads additional air time units credit into prepaid unit 140.

Figure 6:
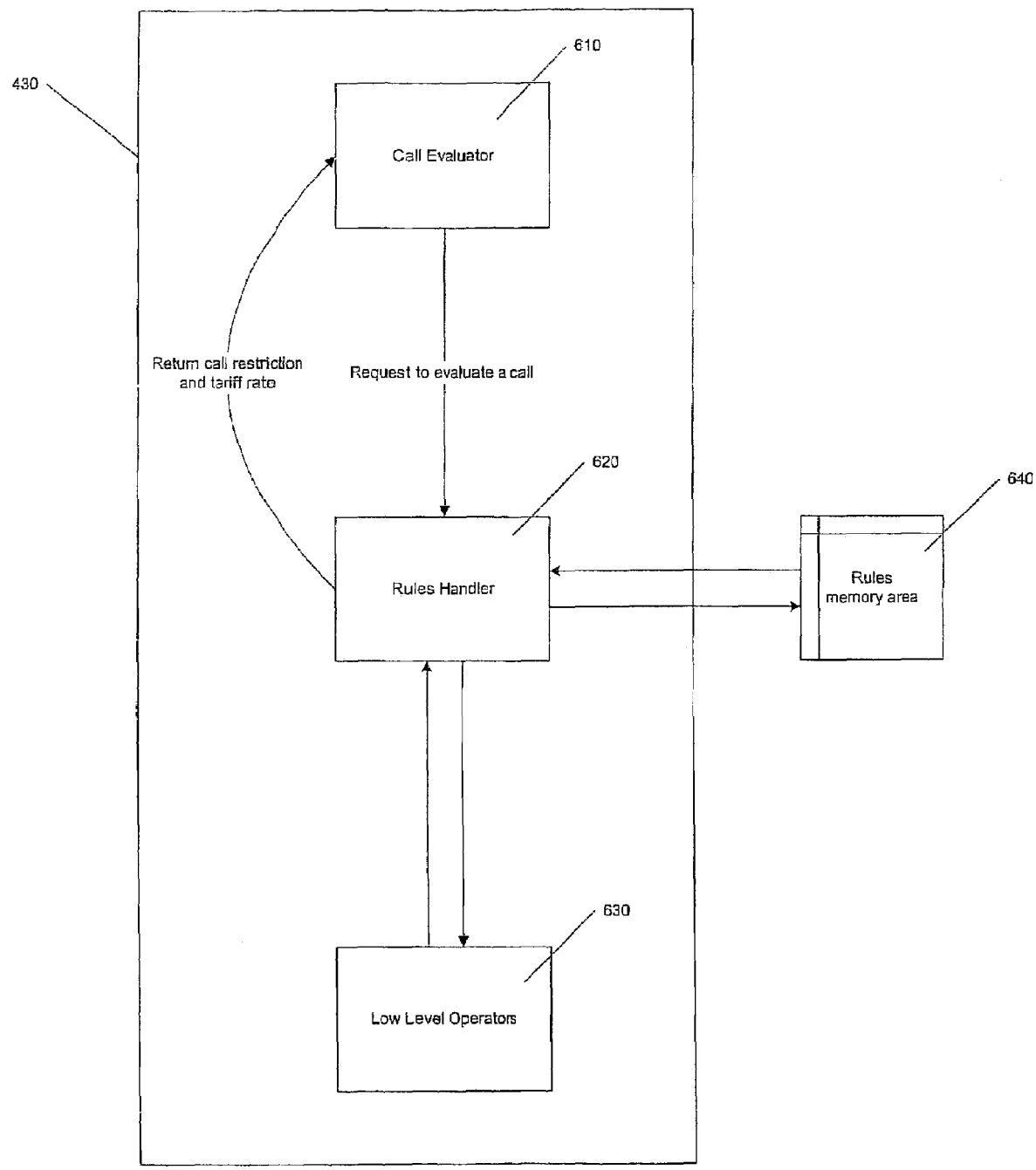
FIG. 6 is a block diagram depicting a rules engine 430 in accordance with an exemplary embodiment of the present invention.

FIG. 6 is a block diagram depicting a rules engine 430 in accordance with an exemplary embodiment of the present invention. Rules engine 430 preferably includes a call evaluator module 610 and a rules handler function 620. The call processor module 420 passes call data to a call evaluator module 610 which evaluates the call data based on rules stored in a designated rules area 640 of memory 220 in order to determine information about call type, call restrictions, and the appropriate deduct rate. The call evaluator module 610 employs the rules handler function 620 to extract and interpret each of the stored rules 640. In interpreting the rules, rules handler function 620 relies on a library of low level operators 630 as needed. Finally, the call evaluator module 610 returns the resulting call restriction and deduct rate information to the call processor module 420.

Figure 7:
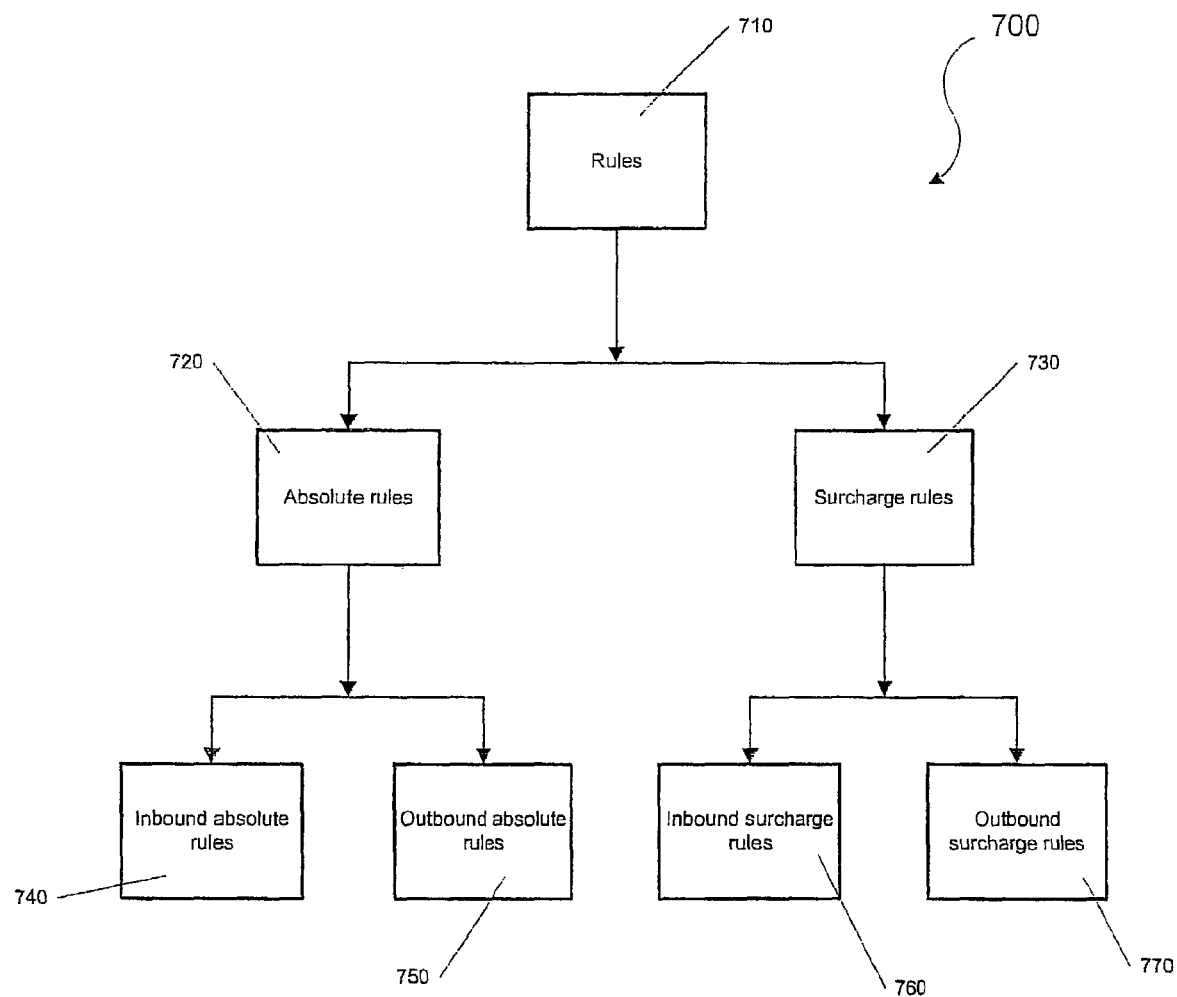
FIG. 7 is a block diagram depicting call processing rules in accordance with an exemplary embodiment of the present invention.

FIG. 7 is a block diagram depicting call processing rules in accordance with an exemplary embodiment of the present invention. Rules 710 are preferably divided into absolute rules 720 and surcharge rules 730. Absolute rules 720 are, for example, used to determine: the base value to deduct based on call type; which calls are restricted; or which calls are free. Surcharge rules 730 determine any added charges that should be applied to the base deduct value such as, for example, roaming charges. Absolute rules 720 may be subdivided into inbound absolute rules 740 and outbound absolute rules 750. Surcharge rules 730 may be subdivided into inbound absolute rules 760 and outbound absolute rules 770. The inbound rules 740, 760 are applied against the telephone number of an incoming call. The outbound rules 750, 770 are applied against the telephone number of an outgoing call.

Although the above-described rules are call processing rules for computing deduct rates, other types of rules are possible in alternative embodiments of the present invention. For example, dialing rules which automatically insert foreign country codes into a user's dialing sequence may be used to make dialing easier. As another example, purchasing rules may be employed whereby available air time units credit may be used as currency to purchase items from certain vending machines.

Figure 8:
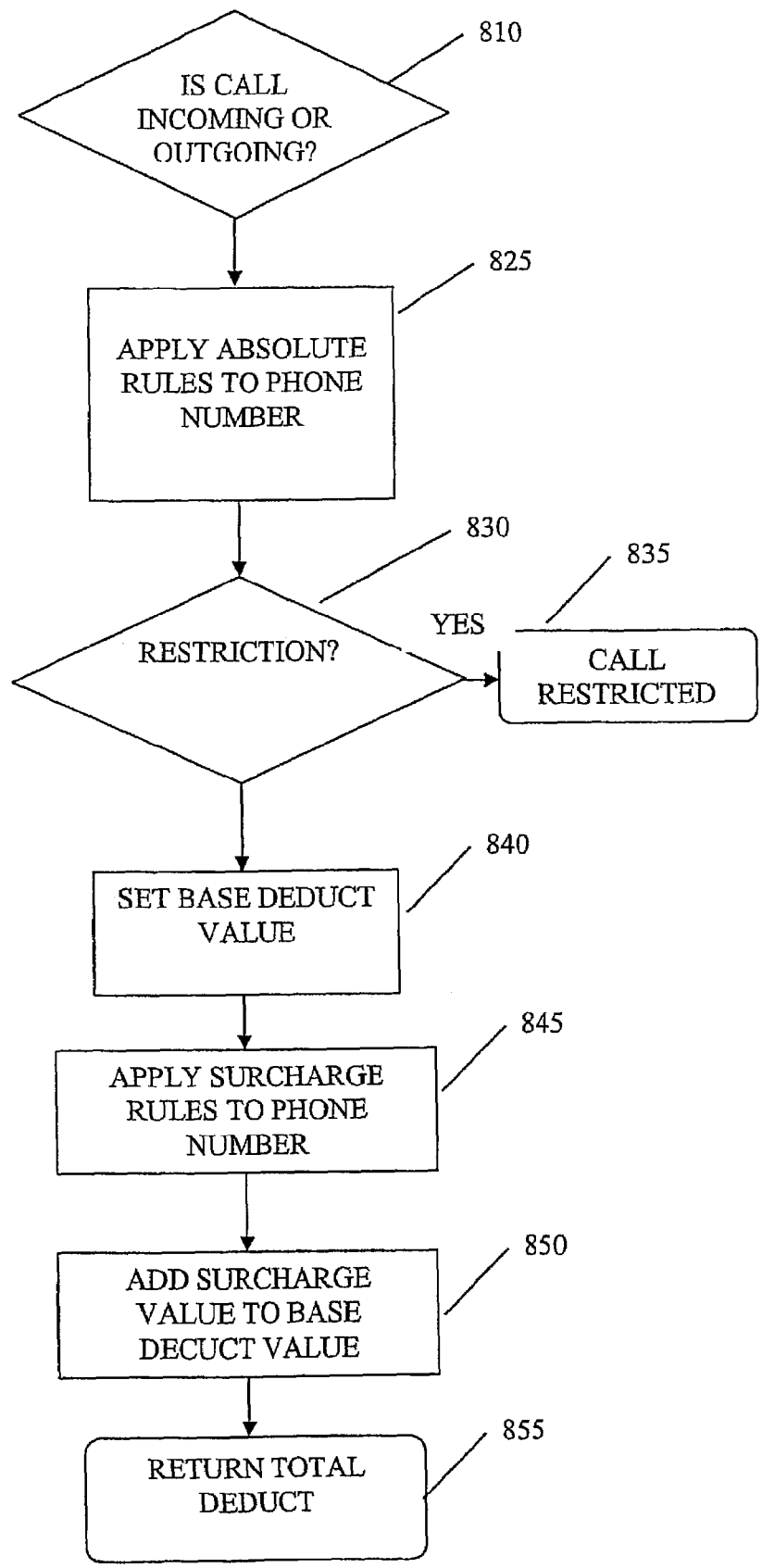
FIG. 8 is a flow chart depicting the flow of data in a rules engine in accordance with an exemplary embodiment of the present invention.

FIG. 8 is a flow chart depicting the flow of data in a rules engine in accordance with an exemplary embodiment of the present invention. At step 810 the prepaid communication device 140 either originates an outgoing call or receives an incoming call. If the call is an incoming call, then rules engine 610 applies the inbound absolute rules 740 to the calling number at step 825. If the call is an outgoing call, then the rules engine applies the outbound absolute rules 750 to the dialed number at step 825.

At step 830, rules engine evaluates the absolute rules 720 to determine whether the call is restricted or allowed. If the call is restricted, the rules engine returns this result to the call processor module 410 at step 835. If the call is allowed, then at step 840 the rules engine determines the base deduct rate to apply. At step 845 the rules engine applies the surcharge rules 730 to the telephone number to determine the surcharge deduct rate. If the call is an incoming call, then rules engine 610 applies the inbound surcharge rules 760 to the calling number at step 845. If the call is an outgoing call, then the rules engine applies the outbound surcharge rules 770 to the dialed number at steps 845. Finally, at step 850, the rules engine adds the surcharge deduct rate determined at step 845 to the base deduct rate determined at step 840. At step 855 the rules engine returns the resulting total deduct rate to the call processor module 410.

In accordance with an exemplary embodiment of the present invention, a rules development toolkit is provided for building programmable rules to be stored in the internal memory 220 of a prepaid unit 140. A rules language is defined in which rules are composed of strings of sequential operands forming sentences. The syntax defines implicit boolean operators between the operands and between the sentences.

Figure 9:
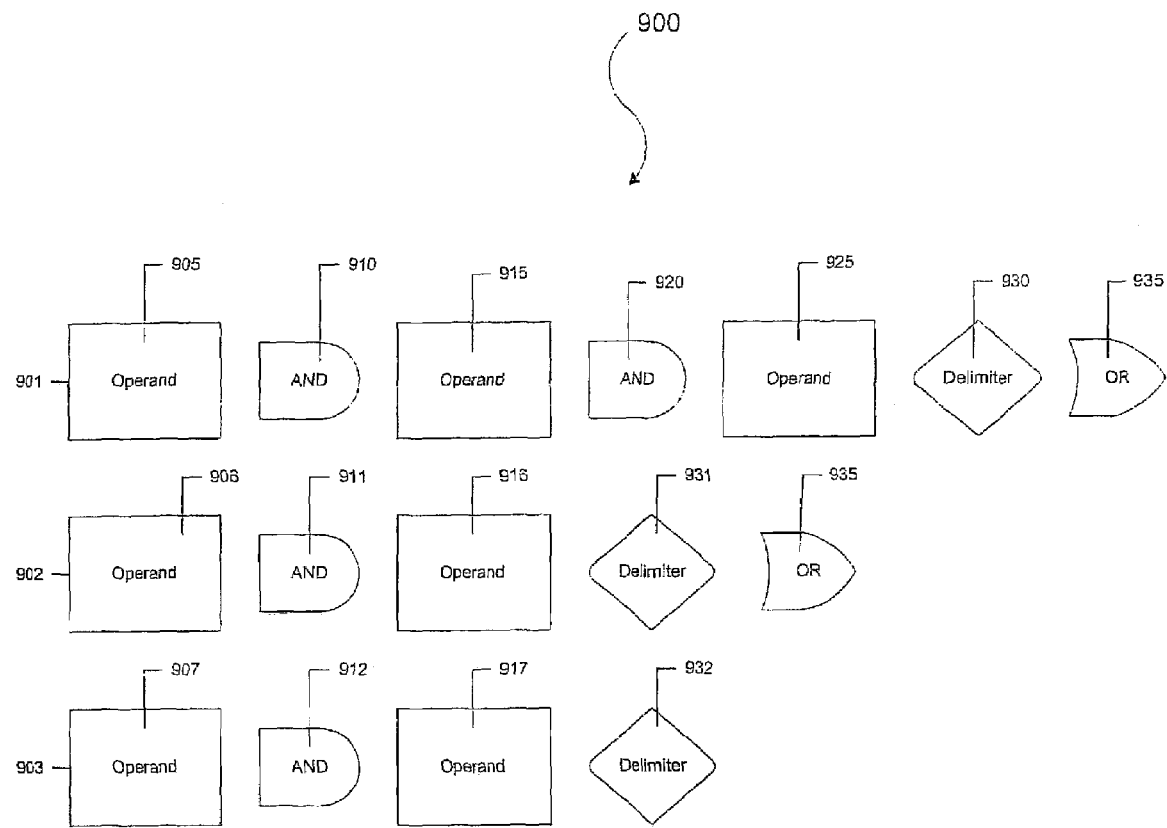
FIG. 9 is a block diagram depicting the composition of absolute rules in accordance with an exemplary embodiment of the present invention.

FIG. 9 is a block diagram depicting the composition of absolute rules in accordance with an exemplary embodiment of the present invention. An absolute rule set 900, includes one or more sentences, shown as 901, 902, and 903, wherein a sentence is composed of one or more operands 905, 915 and 925, for example, for the first sentence 901 shown in rule set 900, terminated by a delimiter operand 930. Likewise, the second sentence 902 of rule set 980 includes operands 906 and 916 and the third sentence 903 includes operands 907 and 917. Between each operand is an implicit boolean AND operator shown as 910 and 920 in sentence 901; 911 in sentence 902; and 912 in sentence 903. Between each sentence is an implicit XOR operator 935. If evaluation of the sentence operands yields a result TRUE, processing of the absolute rule set breaks, i.e., does not continue reading the next sentence. The result of the evaluation of the rule sentence is determined by the rule delimiter operand 930, 931, 932. The delimiter operand 930, 931, 932 determines, for example, the deduct value returned to the call processor module 410.

Figure 10:
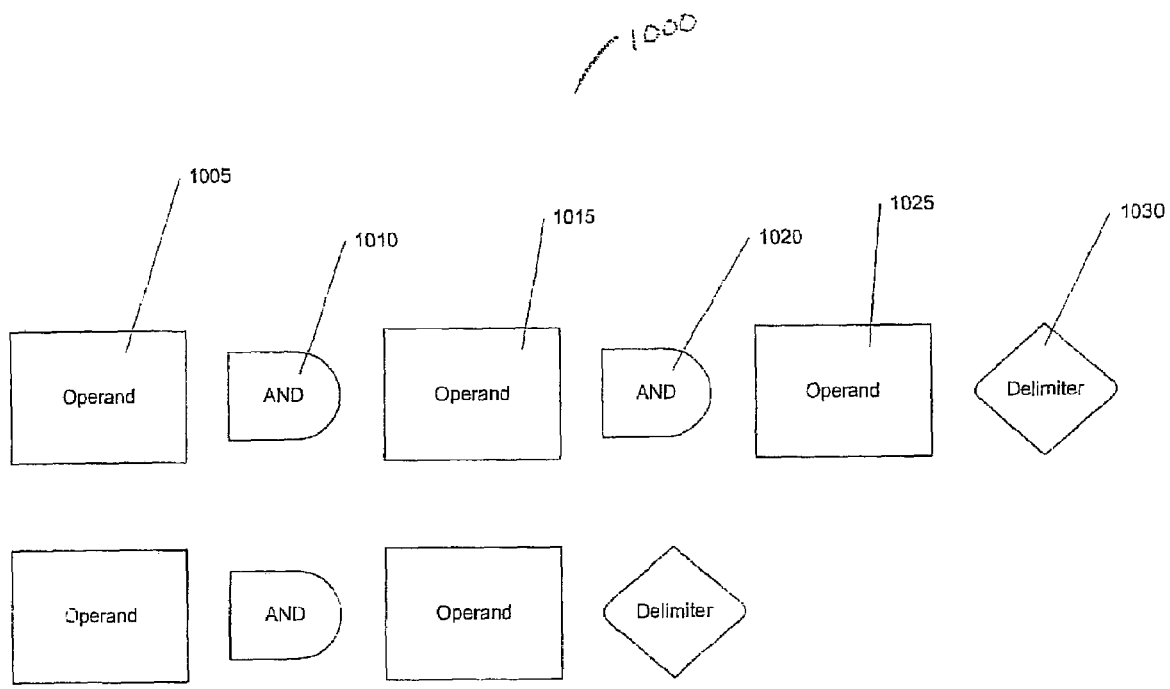
FIG. 10 is a block diagram depicting the composition of surcharge rules in accordance with an exemplary embodiment of the present invention.

FIG. 10 is a block diagram depicting the composition of surcharge rules in accordance with an exemplary embodiment of the present invention. Similar to the absolute rules set 900, the surcharge rules set 1000 also includes one or more sentences, wherein a sentence is, for example, composed of one or more operands 1005, 1015, 1025 terminated by a delimiter operand 1030. Between each operand is an implicit boolean AND operator 1010, 1020. If evaluation of the sentence operands yields a result TRUE, processing of the surcharge rule set does not break, but continues reading the next sentence and continues until all sentences have been evaluated. Surcharge rules processing also differs from absolute rules processing in that a sentence's delimiter operand value is added to the result generated by the absolute rules if and only if the resulting value for the sentence evaluated is TRUE.

The operands used to construct rules according to an exemplary embodiment of the present invention, are composed of a low-level operator and its corresponding arguments. The following table is an example of a library of low-level operators that may be employed in a rules toolkit in accordance with an exemplary embodiment of the present invention.

| Operator Mnemonic | Arguments Tag: Description | Description |
| --- | --- | --- |
| LENEQ(A1) | A1: Number length | Length of data string compared to A1. Return true if equal to A1, else return false. |
| LENGT(A1) | A1: Number length | Length of data string compared to A1. Return true if greater than A1, else return false. |
| LENLT(A1) | A1: Number length | Length of data string compared to A1. Return true if less than A1, else return false. |
| LENRG(A1!A2) | A1: Number minimum length<br>A2: Number offset to minimum for max length | Length of data string compared to (A1). Return true if greater than or equal to A1 AND less than or equal to A1 + A2, else return false. |
| PATRN(A1) | A1: Pattern construct | Data string compared against A1 to determine its structure match. Return true if match is found, else return false. |
| DELM# | No arguments | Delimits the end of a sentence of operands and indexes into a stored deduct value. Upon match of all true up to this delimiter operand within a sentence, the deduct value at memory location index # is returned as the deduct rate. |
| DELM0 | No arguments | Delimits the end of a sentence of operands and indicates a zero deduct value, i.e., a free call. |
| DELMF | No arguments | Delimits the end of a sentence of operands and indicates a restricted call and sets the call termination indicator. |
| HOLD(A1) | A1: index to deduct value | Delimits the interim end of a sentence of operands, and indexes into a stored deduct value. Only applicable if all the remaining operands between this operand and the "end of sentence" delimiter operand yield a false result. |
| MLIST(A1!A2 . . . ) | A1: Match list of numbers separated by "!" | Compare the data string to a list of possible values A1 and return true if a match is found, else return false. |
| XRULE(A1) | A1: address | Process a rule sentence from ROM memory location A1. Allows multiple operands stored in ROM during firmware load to be referenced by a single operand during programmable rule construct. |
| FTEST(A1) | A1: bit number | Returns true if bit indicated in A1 is set (1), else return false. |
| FSETB(A1) | A1: bit number | Pass current result (1/0) of rule state into bit indicated by A1. Always return true. |
| FTSTB(A1) | A1: bit number | Return true if bit indicated in A1 is set (1), else return false. |
| SUBFU(A1) | A1: function | Custom functions as follows:<br>1-return true always;<br>2-return false always;<br>3-force next operand to invert its result (if 0 then 1 and vice versa). |

| Operator Mnemonic | Arguments Tag: Description | Description |
|---|---|---|
| ALIST(A1!A2 ... ) | A1: starting position to compare elements in A2<br>A2: list of elements | Matches the A2 list of elements against dial buffer starting at position A1 and controlled by A2 value length. Return true upon match, else return false. |
| LLIST(A1) | A1: starting position to compare | Matches a list of elements against the dial buffer starting at position A1. Similar to ALIST but elements are independently updated. Main purpose is for Area Codes matching. |

Figure 11:
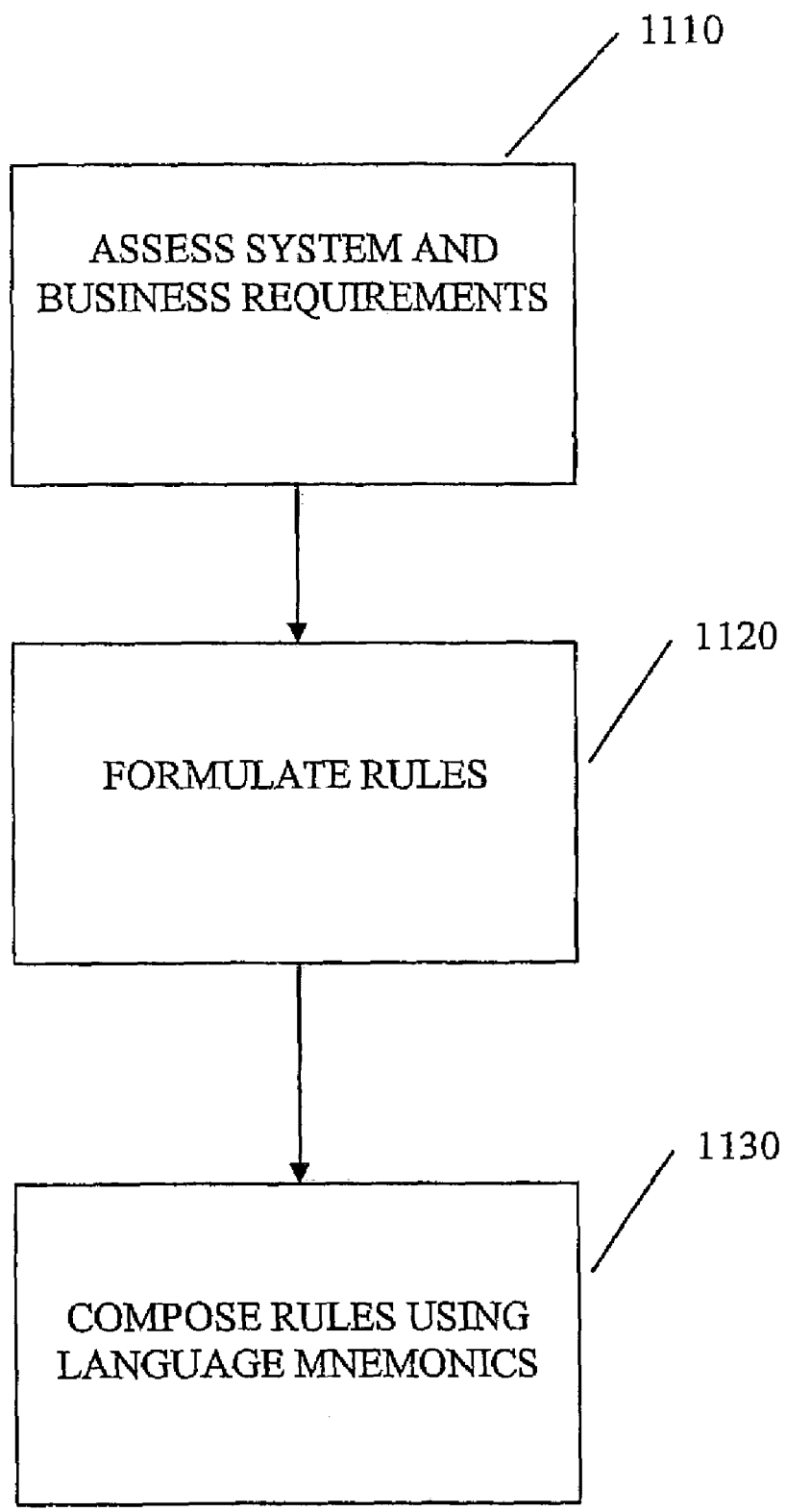
FIG. 11 is a flowchart depicting the process of rules development in accordance with an exemplary embodiment of the present invention.

FIG. 11 is a flowchart depicting an exemplary process for rules development in accordance with an exemplary embodiment of the present invention. The rule development process begins at step 1110 with the call center 130 performing an assessment of the system and business requirements of the country or region in which the prepaid unit 140 will operate. Examples of country or region specific business requirements include the local telephone numbering plan, rate charging scheme, and telephone dialing parameters. Examples of country or region specific business requirements include prepaid service options offering users special rates or services or any restrictions on use of the prepaid service.

Using information gathered during the assessment process, step 1110, the call center 130 formulates rules at step 1120 for determining charge rates for the area in which the prepaid communication device 140 will operate. The rules may define, for example, call restrictions, call types, deduct rates, and any other information the prepaid unit's 140 software needs in order to achieve prepaid functionality in that particular area.

Once formulated, the rules may be organized into, for example, four groups: outbound absolute rules 750, outbound surcharge rules 770, inbound absolute rules 740, and inbound surcharge rules 760. Using a standard ASCII text editor, the developer at step 1130 may compose rule sentences according to the syntax as described above, e.g. OPERAND(ARGUMENT) OPERAND(ARGUMENT) OPERAND(ARGUMENT) DELIMITER, where OPERAND (ARGUMENT) stands for one of the low-level functions and arguments described in the table above.

One or more rule sentences may be stored in a rule file, with each rule file corresponding to one of the four rule groupings. The size of a rule file may be limited by, for example, the prepaid unit's 140 memory constraints and by the requirements of the transport mechanism used.

Figure 12:
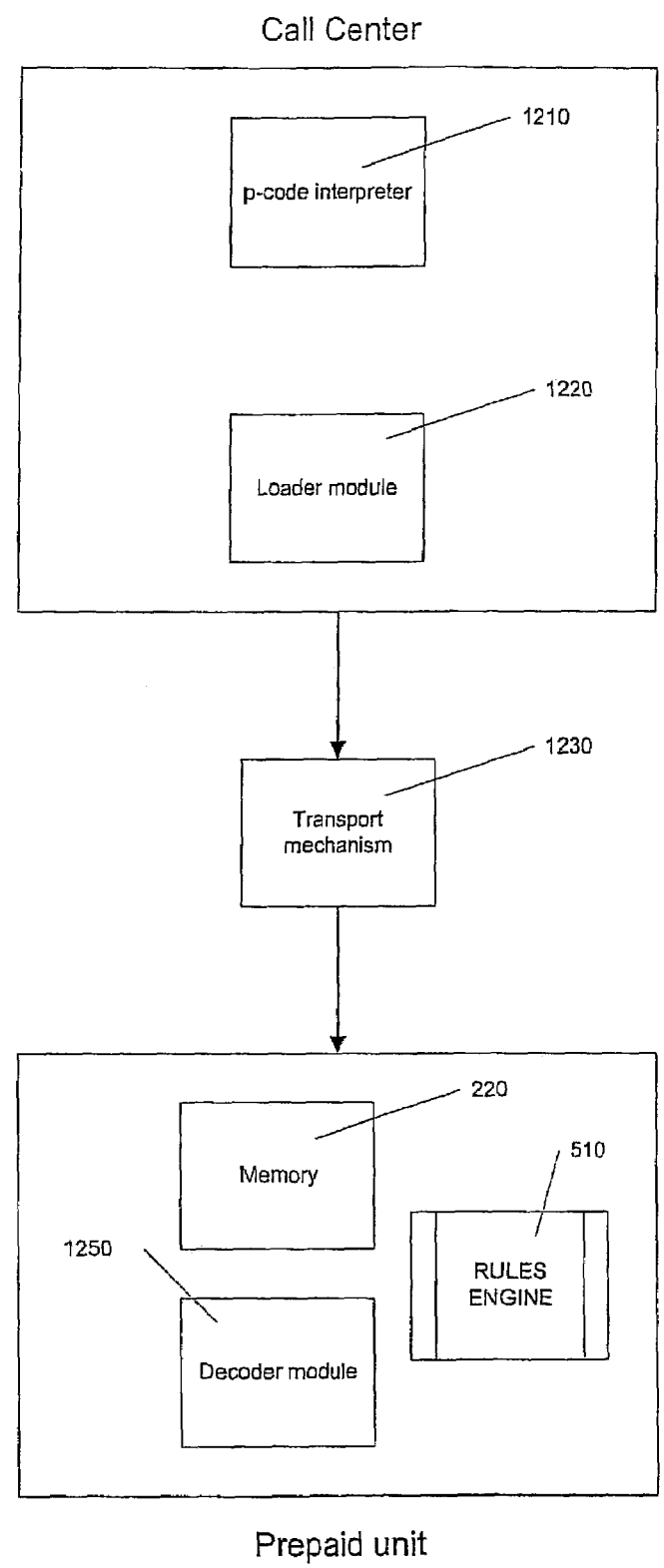
FIG. 12 is a block diagram depicting a software architecture for loading rules in accordance with an exemplary embodiment of the present invention.
Figure 13:
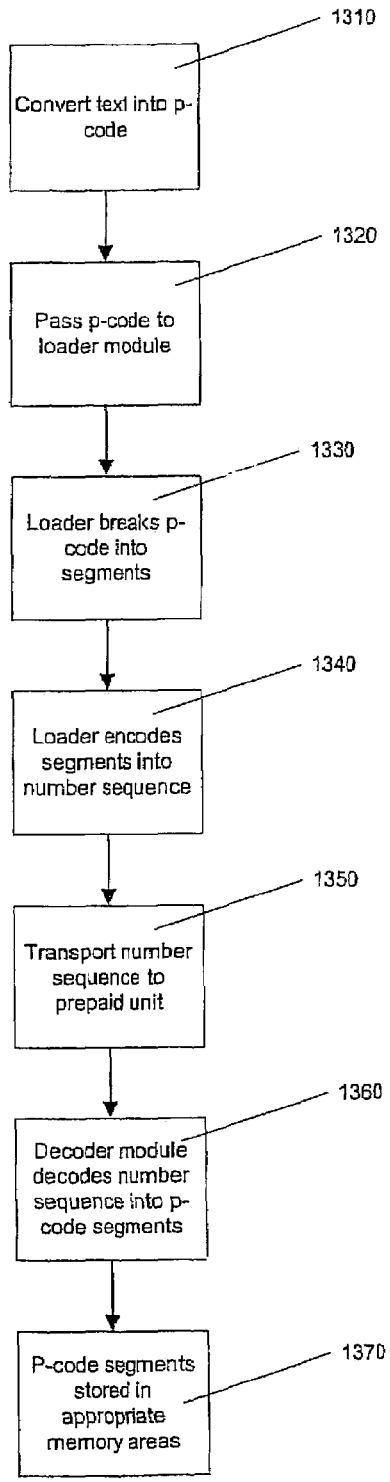
FIG. 13 is a flowchart depicting the process of loading rules in accordance with an exemplary embodiment of the present invention.

FIG. 12 is a block diagram depicting a software architecture for loading rules in accordance with an exemplary embodiment of the present invention. FIG. 13 is a flowchart depicting the process of loading rules in accordance with an exemplary embodiment of the present invention. Referring to FIGS. 12 and 13, each of the four rule files are passed through an ASCII based pseudo-code ("p-code") interpreter 1210 and converted into p-code at step 1310. The p-code interpreter packs the text files into a compressed format such as, for example, Binary Coded Decimal ("BCD"), to make efficient use of the prepaid communication device's units 140 limited internal memory space. At step 1320, the p-code is passed to a loader module 1220, which prepares the p-code for delivery to the prepaid communication device 140 via a transport mechanism 1230. The transport mechanism 1230 may be simple manual entry of numbers using the prepaid communication devices unit's 140 keypad 230, or the transport mechanism may utilize an over-the-air transport protocol such as DTMF, OTASP, or OTAPA.

The loader module 1220 prepares the p-code for delivery by packaging the p-code into segments at step 1330, taking the transport mechanism 1230 into account. The loader module 1220, for example, may add header information to each p-code segment which facilitates the storage of p-code in appropriate memory locations 220. The loader module then encodes the p-code segments into sequences of numbers at step 1340.

Using transport mechanism 1230 the numbers are transferred into the prepaid unit 140 at step 1350. At step 1360, inside the prepaid unit 140, a decoder module 1250 decodes the number sequence back into p-code segments and at step 1370 stores them in appropriate areas of memory 220 where they can be retrieved as needed by the rules engine 510.

In one embodiment, the rules p-code may be encrypted prior to delivery to the prepaid communication device 140, and decrypted at the prepaid communication device 140. Encryption/decryption may be performed by using shared keys, or may alternatively be performed using public/private key pairs.

Although the present invention was discussed in terms of certain preferred embodiments, the invention is not limited to such embodiments. A person of ordinary skill in the art will appreciate that numerous variations and combinations of the features set forth above can be utilized without departing from the present invention as set forth in the claims. Thus, the scope of the invention should not be limited by the preceding description but should be ascertained by reference to claims that follow.

What is claimed is:

1. A method for providing internally stored rules of operation to a mobile communications device, the method comprising:
   comprising one or more absolute rules wherein:
   the absolute rules are composed of one or more operand sentences;
   each operand sentence includes a sequence of one or more operands;
   each operand is separated from the next sequential operand by an implicit boolean AND operator;
   each operand sentence is terminated by a delimiter operand, the delimiter operand corresponding to a result;
   each of the operand sentences is sequentially evaluated, the evaluation being either true or false;
   an operand sentence evaluation of false causes the next sequential operand sentence to be evaluated;

an operand sentence evaluation of true halts further operand sentence evaluation, the delimiter value of said true operand sentence being the result dictated by the absolute rules;

using a predefined rules development language to compose one or more rules of operation in a text format;

converting the rules of operation from the text format into a compressed format;

encoding the compressed rules of operation into a sequence of numbers;

using a transport mechanism to transfer the number sequence to an internal memory area of the mobile communications unit;

decoding the number sequence into compressed rules of operation; and storing the compressed rules of operation in predefined areas of nonvolatile random access memory of the mobile communications unit.

2. The method of claim 1 further comprising the steps of composing one or more surcharge rules, wherein:

the surcharge rules are composed of one or more operand sentences;

each operand sentence includes a sequence of one or more operands;

each operand is separated from the next sequential operand by an implicit boolean AND operator;

each operand sentence is terminated by a delimiter operand, the delimiter operand corresponding to a result;

each of the operand sentences is sequentially evaluated, the evaluation being either true or false;

each operand sentence evaluation of true has a value corresponding to said operand sentence's delimiter operand;

each operand sentence evaluation of false has a value of zero; and each operand sentence is evaluated until all the operand sentences have been evaluated, and the resulting values of the operand sentence evaluations are added together to form the result of the surcharge rules evaluation.

3. The method of claim 2 wherein the mobile communication unit is a prepaid unit.

4. The method of claim 3 wherein the transport mechanism includes manually inputting the number sequence via an alphanumeric keypad.

5. The method of claim 3 wherein the transport mechanism includes transferring the number sequence using an over-the-air transport protocol.

6. The method of claim 3 wherein the transport mechanism includes transferring the number sequence using DTMF tones.

* * * * *